Patented Feb. 6, 1951

2,540,985

UNITED STATES PATENT OFFICE 2,540,985

QUATERNARY AMMONIUM DERIVATIVES OF VINYLPYRIDINE-POLYVINYLBENZENE COPOLYMERS

Elwood F. Jackson, Ludlow, Mass., assignor to Monsanto Chemical Company, St. Louis, Mo., a corporation of Delaware No Drawing. Application December 6, 1949, Serial No. 131,507

7 Claims. (Cl. 260—88.1)

This invention relates to quaternary ammonium derivatives of copolymers of vinyl pyridine and divinyl benzene or trivinyl benzene and to processes for preparing them.

The copolymers of vinyl pyridine and divinyl benzene or trivinyl benzene are disclosed and claimed in my copending application S. N. 55,425 filed October 19, 1948. These copolymers are insoluble and infusible resins which are particularly useful as ion exchange media. However, for the removal of some ions and especially for the breakdown of salts such as sodium chloride the copolymer resins were inefficient and of little value.

One object of this invention is to provide quaternary derivatives of copolymers of vinyl pyridine and the divinyl benzene or trivinyl benzene.

A further object is to provide new ion exchange resins.

These and other objects are attained by reacting a copolymer of vinyl pyridine and divinyl benzene or trivinyl benzene with a quaternizing agent.

The following examples are given in illustration and are not intended as limitations on the scope of this invention. Where parts are mentioned they are parts by weight.

Example I

One mol of a copolymer prepared by polymerizing a mixture of 100 parts of vinyl pyridine and 5 parts of divinyl benzene, was slurried in methanol. 1.5 mols of methyl iodide were added to the slurry which was then agitated for about twelve hours at about 30° C. Excess methyl iodide and methanol were removed by filtration. The product was a quaternary salt having a methyl group and an iodine atom attached to the nitrogen of the pyridine ring. The quaternary salt could be converted to a quaternary ammonium hydroxide by slurrying the resin in an aqueous medium containing sufficient sodium hydroxide to react with the iodine and form sodium iodide. Since the resin was insoluble in water, it could easily be recovered as the quaternary base by simple filtration.

Example II

A slurry was prepared by dispersing 1 mol of a vinyl pyridine-trivinyl benzene copolymer in benzene with agitation. Said copolymer was prepared by polymerizing 100 parts of 2-vinyl pyridine with 11 parts of trivinyl benzene. About 1.5 mols of methyl iodide were added to the slurry which was then placed in a sealed container which was maintained at about 50° C. for about fifteen hours under constant agitation. The container was then opened and the quaternized resin was recovered by filtration. Further treatment with sodium hydroxide converted the quaternary salt into a quaternary base.

Example III

A bead resin made by the aqueous suspension polymerization of 100 parts of vinyl pyridine with 15 parts of divinyl benzene was slurried in methanol. The slurry was cooled to about 0° C. and methyl bromide which had been precooled to about —25° C. was added to the slurry with constant agitation. The amount of methyl bromide added was in excess of a molar equivalent amount based on the copolymer. The slurry was maintained at 0° C. for about two hours with constant agitation and then the temperature was raised to about 35° C. The reaction was continued at 35° C. for about eighteen hours with constant agitation. The methanol and excess methyl bromide were removed by filtration and the beads were washed with methanol to remove residual traces of the methyl bromide. The quaternary ammonium salt thus produced was in the same physical form as the unmodified copolymer. It was insoluble and infusible, hard and tough. The salt could be converted to the quaternary ammonium base by reacting it with sodium hydroxide in an aqueous slurry.

Example IV

A bead copolymer was prepared by copolymerizing 100 parts of vinyl pyridine with 5 parts of trivinyl benzene in aqueous emulsion. The beads were insoluble and infusible. One mol of the beads was slurried in dioxane and about 1.2 mols of diethyl sulfate were added. The slurry was heated at reflux temperature for three hours with constant agitation. The reaction medium was then cooled and filtered to recover the insoluble quaternary salt. The salt was easily converted to the hydroxide by reacting it with sodium hydroxide in an aqueous slurry.

The copolymers which are the starting materials of this invention are copolymers of 100 parts of vinyl pyridine with from 1 to 20 parts of divinyl benzene or trivinyl benzene. They may be prepared by mass, solution, suspension or emulsion polymerization methods as more fully set forth in my copending application S. N. 55,425. They are insoluble and infusible resins, some of which contain a slight amount of red or yellow coloring which appears to be due to the internal structure of the resin, since the color cannot be leached out. A majority of the copolymers are substantially colorless and transparent. They range from soft elastic materials to hard rigid materials and are substantially insoluble in acids, alkalies, water and organic solvents. However the copolymers swell in aqueous media and become permeable to reactants such as the quaternizing agents so that practically complete reaction may be obtained in spite of the insolubility.

The quaternizing agents should be used in at least molar equivalent quantities based on the copolymer, although it is preferred to use an excess in order to speed up the reaction and to ensure a complete reaction. Due to the insoluble nature of the copolymer and the quaternary derivatives thereof, the excess quaternizing agent may be easily removed from the finished product by filtration and washing.

The insoluble nature of the copolymers makes it necessary to prolong the quaternizing action in order to ensure complete reaction. The quaternizing reaction is best carried out in a slurry of particulate copolymer in an inert organic material such as benzene, methanol, dioxane, ethanol, isopropanol, butanol, Cellosolve, Carbitol, ethyl lactate, ketones, nitroparaffins, etc. These materials are not solvents for the polymer but do dissolve the quaternizing agent and make it possible for the latter to penetrate the porous copolymer particles.

Among the quaternizing agents which may be used are the alkyl halides such as methyl bromide, ethyl bromide, methyl iodide, ethyl iodide, butyl iodide, lauryl iodide, etc., alkyl sulfates such as the diethyl, dimethyl, dipropyl, dibutyl, diisobutyl, dioctyl, dilauryl etc., sulfates, alkyl aryl sulfonates such as butyl benzene sulfonate, butyl toluene sulfonate, ethyl toluene sulfonate, octyl benzene sulfonate etc.

The quaternary salts of this invention may be used in the dyestuff industry as intermediates but a more important use is in the form of the free base as ion exchange media. By treating the salts with an alkali such as ammonium, sodium, potassium, rubidium or cesium hydroxide in an aqueous slurry, the salt forming group is replaced by the hydroxyl group. Again the insoluble nature of the compounds makes the process for removing the salt formed with the alkali a matter of simple filtration and washing. The quaternary ammonium hydroxides thus formed are strong bases which will not only remove anions from the weakest of acids but also will split salts such as sodium chloride, removing the chlorine ions from the salt solution and producing sodium hydroxide.

Dynamic evaluations of the quaternary bases prepared as shown in the examples gave values of between 25 and 35 kilograins per cubic foot of resin, calculated as calcium carbonate when acids of varying strengths were used. The tests also disclosed that the resins had a capacity of greater than 12 kilograins per cubic foot when used to remove the anion from sodium chloride. The dynamic evaluation test involves using the resins in a standard columnar ion exchange apparatus under conditions closely approximating standard operating conditions.

The quaternary ammonium bases of this invention are insoluble, infusible and relatively hard when compared to more conventional ion exchange resins. They contain no toxic or colored impurities which can be leached out by the media being treated in ion exchange processes. They may be regenerated by treatment with strong alkalies. Since they are insoluble in acids, bases and organic solvents, they may be used to remove anions from aqueous and organic media without danger of softening the resin and plugging up the ion exchange apparatus. Being infusible, they may be used in ion exchange operations at temperatures considerably above that normally used thus providing a method for purifying various materials which are solid at room temperature but liquid at temperatures between 50 and 100° C.

It is obvious that many variations may be made in the products and processes of this invention without departing from the spirit and scope thereof as defined in the appended claims.

What is claimed is:

1. A quaternary ammonium salt of a copolymer of 100 parts of vinyl pyridine and from 1 to 20 parts of a compound taken from the group consisting of divinyl benzene and trivinyl benzene.

2. A quaternary ammonium salt of a copolymer of 100 parts of vinyl pyridine with from 1 to 20 parts of divinyl benzene.

3. A quaternary ammonium salt of a copolymer of 100 parts of vinyl pyridine and from 1 to 20 parts of trivinyl benzene.

4. A quaternary ammonium hydroxide of a copolymyer of 100 parts of vinyl pyridine and from 1 to 20 parts of a compound taken from the group consisting of divinyl benzene and trivinyl benzene.

5. A quaternary ammonium hydroxide of a copolymer of 100 parts of vinyl pyridine and from 1 to 20 parts of divinyl benzene.

6. A quaternary ammonium hydroxide of a copolymer of 100 parts of vinyl pyridine with from 1 to 20 parts of trivinyl benzene.

7. A compound taken from the group consisting of quaternary ammonium salts and quaternary ammonium hydroxides of copolymers of 100 parts of vinyl pyridine and from 1 to 20 parts of a compound taken from the group consisting of divinyl benzene and trivinyl benzene.

ELWOOD F. JACKSON.

REFERENCES CITED

The following references are of record in the file of this patent:

UNITED STATES PATENTS

| Number | Name | Date |
| --- | --- | --- |
| 2,484,420 | Minsk | Oct. 11, 1949 |